(12) United States Patent
De' Longhi

(10) Patent No.: US 8,656,828 B2
(45) Date of Patent: Feb. 25, 2014

(54) ELECTRIC OVEN FOR COOKING FOOD

(75) Inventor: Giuseppe De' Longhi, Treviso (IT)

(73) Assignee: De' Longhi S.p.A. (IT)

( * ) Notice: Subject to any disclaimer, the term of this patent is extended or adjusted under 35 U.S.C. 154(b) by 1112 days.

(21) Appl. No.: 12/108,705

(22) Filed: Apr. 24, 2008

(65) Prior Publication Data

US 2009/0107343 A1    Apr. 30, 2009

(30) Foreign Application Priority Data

Oct. 30, 2007   (IT) .............................. MI2007A2086

(51) Int. Cl.
*A47J 37/06*         (2006.01)

(52) U.S. Cl.
USPC .................................. 99/352; 99/391; 99/393

(58) Field of Classification Search
USPC ............ 99/372, 379, 385, 352, 422, 391, 393
See application file for complete search history.

(56) References Cited

U.S. PATENT DOCUMENTS

| | | | |
|---|---|---|---|
| 1,955,867 A * | 4/1934 | Wilkie et al. .................... | 99/390 |
| 3,010,383 A * | 11/1961 | Greene ............................ | 99/332 |
| 3,034,420 A * | 5/1962 | Wenger ............................ | 99/392 |
| 3,193,663 A * | 7/1965 | Budzich et al. ................ | 219/405 |
| 4,091,720 A * | 5/1978 | Wheeler .......................... | 99/375 |
| 4,178,500 A * | 12/1979 | Brindopke ..................... | 219/524 |
| 4,206,345 A * | 6/1980 | Maass et al. ................... | 219/524 |
| 6,257,126 B1 * | 7/2001 | Veljkovic et al. ............... | 99/349 |
| 6,439,108 B1 * | 8/2002 | Wu .................................. | 99/349 |
| 7,109,442 B2 * | 9/2006 | Steinberg et al. ............. | 219/386 |

FOREIGN PATENT DOCUMENTS

CN            2756131 Y       2/2006

OTHER PUBLICATIONS

Examination Report for Corresponding Chinese Patent Application 200810172560.X; Date of Notification: Mar. 10, 2010; 9 pgs.
Examination Report for Corresponding Chinese Patent Application 200810172560.X; Date of Notification: Sep. 9, 2010; 8 pgs.
Examination Report for Corresponding Chinese Patent Application 200810172560.X; Date of Notification: Jan. 13, 2011; 9 pgs.

* cited by examiner

*Primary Examiner* — Henry Yuen
*Assistant Examiner* — John Wasaff
(74) *Attorney, Agent, or Firm* — Hiscock & Barclay, LLP

(57) ABSTRACT

An electric oven includes a cooking chamber having at least one heating member and at least one support member for supporting food, the cooking chamber being provided with a movable pressing member for pressing the food against the support member to cook the food while kept pressed.

13 Claims, 2 Drawing Sheets

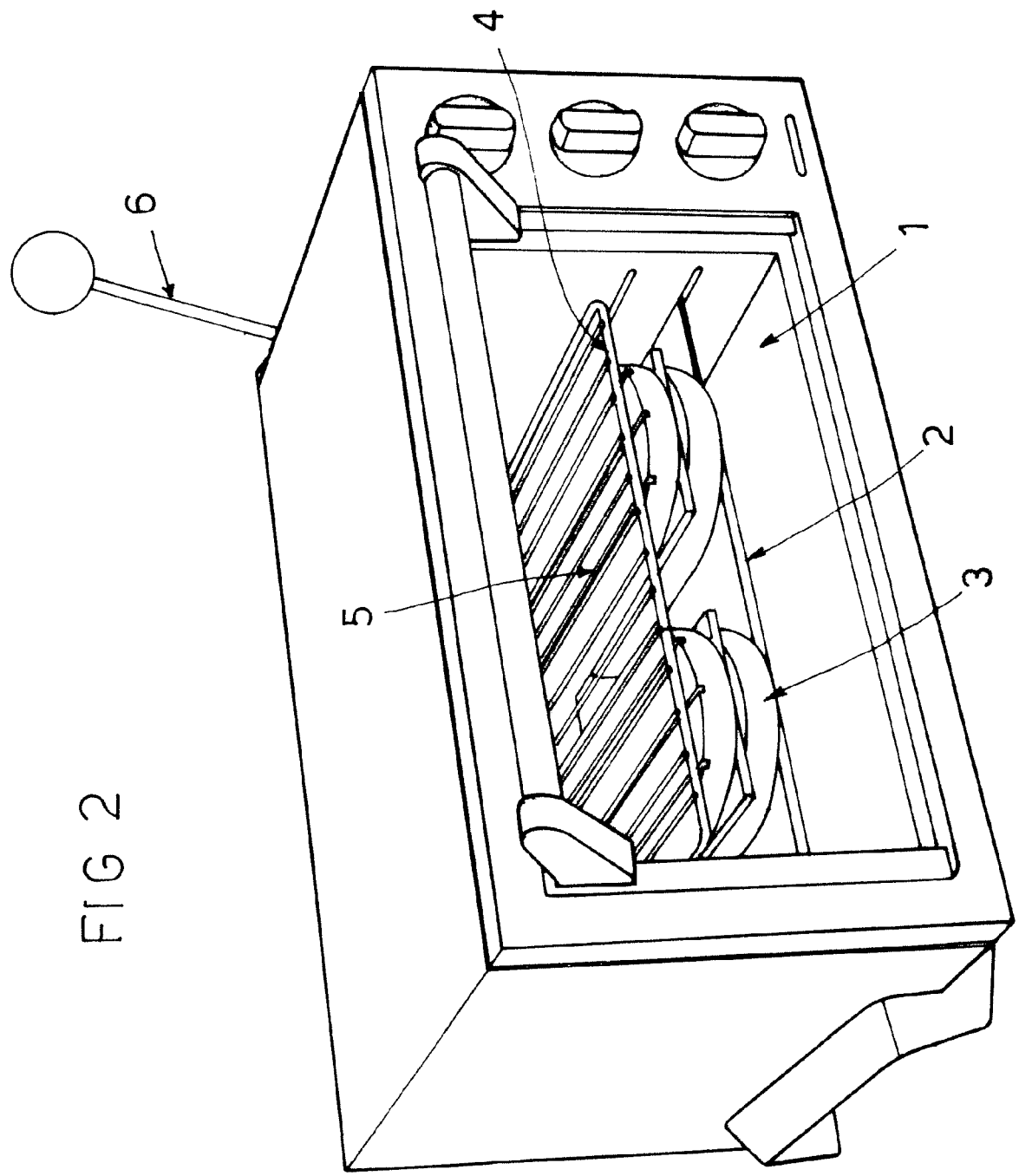

ELECTRIC OVEN FOR COOKING FOOD

FIELD OF THE INVENTION

The present invention relates to an electric oven.

BACKGROUND OF THE INVENTION

Electric ovens have existed in the market for some time. These typically comprise a cooking chamber and one or two electric heating members. Food is placed upon a support member within the cooking chamber, usually in-between two heating elements such that the food is cooked from both above and below.

However, electric ovens of the prior art are limited in their functionality. In particular, they do not shape to the food being cooked. In some foods, the correct characteristics, such as consistency, are dependent on the shaping of the food during cooking as the cooking action is influenced by the thickness of the food to be cooked. As such, electric ovens of the prior art are limited in the range of food that they are applicable to. Specifically, such ovens are not able to create the final pressed shape of certain foods, such as paninis and toasts.

A user is therefore required to have an additional household appliance in order to cook foods that require, or preferably have, shaping during cooking. This not only increases the space required in a kitchen, but also the complexity of the kitchen environment and its cost.

Furthermore, electric ovens of the prior art do not produce any particular pattern on the surface of the food being cooked.

SUMMARY OF THE INVENTION

The technical task proposed by the present invention is therefore that of providing an electric oven which overcomes the noted technical drawbacks of the prior art.

Within the scope of this technical task, one object of the invention is that of providing an electric oven with increased functionality, particularly with an improved capability to cook and prepare a broader variety of foods always ensuring the best quality for the final product.

Another object of the invention is that of providing a simple, cost-effective electric oven with the functionality of shaping the food being cooked.

A further object of the invention is that of providing an electric oven capable of creating a desired pattern on at least one surface of the food being cooked.

A last but not least object of the invention is that of providing a space-efficient electric oven capable of cooking and shaping food. The technical task, as well as these and other objects, are achieved according to the present invention by an electric oven according to the claims.

The presence of a movable pressing member enables the shaping action to take place while the food is being cooked, thereby increasing the functionality of the electric oven.

The pressing member of the present invention being movable within the housing renders the oven capable of cooking a wide variety of size of foods, thereby further increasing its functionality. The pressing member is also able to produce a particular pattern on the surface of the food at the points of contact.

Furthermore, the movable pressing member within the cooking chamber provides a simple, cost-effective way of preventing the need for an additional appliance specifically for cooking foods that require a certain shape. By obviating the need for a separate appliance for these foods, this also reduces the space needed for appliances in, for example, a kitchen.

The pressing member being movable within the cooking chamber also renders the electric oven intrinsically space efficient as it does not necessarily require an increase in size of the cooking chamber or of the overall electric oven relative to electric ovens of the prior art.

BRIEF DESCRIPTION OF THE DRAWINGS

FIG. 2 shows a perspective view of an electric oven in a cooking and pressing position in accordance with one embodiment of the invention.

DETAILED DESCRIPTION

Figure 1:
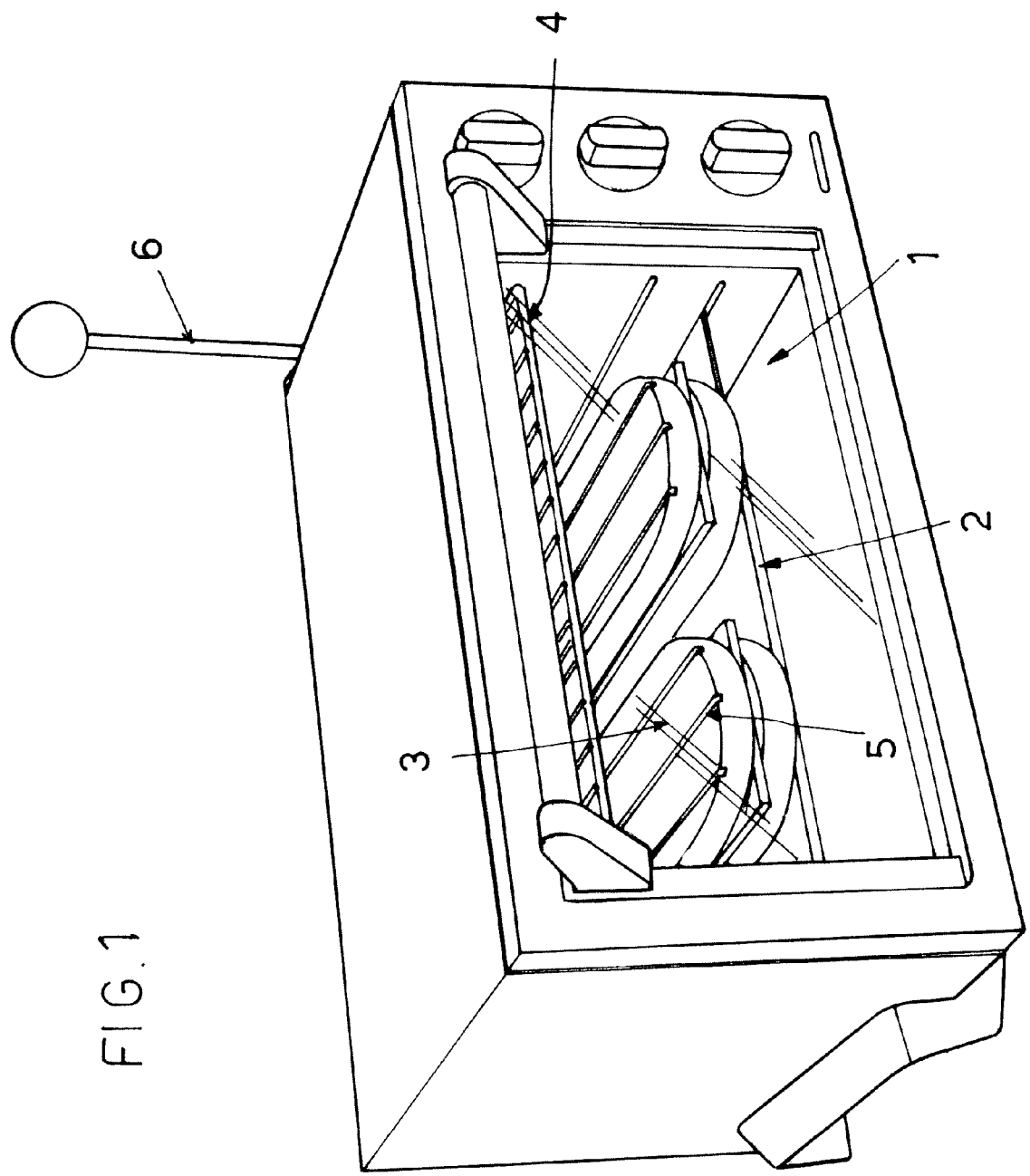
FIG. 1 shows a perspective view of an electric oven in a cooking position in accordance with one embodiment of the invention.

With reference to the above figures, the electric oven comprises a cooking chamber (1) having at least one and in particular a first and second heating members (not shown). These heating members are preferably electric heating coils mounted at the top and bottom of the cooking chamber (1). A support member (2), preferably in the form of a heat conductive tray, for supporting food (3), such as paninis or toasts, is located within the cooking chamber (1), in between the first and second heating members.

A pressing member (4), preferably in the form of a heat conductive wire rack, is movably mounted within the cooking chamber (1). When the oven is turned on, the pressing member is heated by convection from the first and second heaters. The pressing member is displaceable at least vertically such that it can be raised up away from the food (3) or lowered down to press the food against the support member (2).

When the pressing member (4) is in a raised position and the oven is turned on, the oven can perform the usual cooking function of cooking the food by heating by the first and second heaters located above and below the support member (2). When the pressing member (4) is in a lowered position and the oven is turned on, it presses the food (3) against the support member (4) and performs a shaping function by contacting the food while both the food and the pressing member are being heated by the first and second heaters located above and below the support member (4) and the food (3), the food is grilled such that a pattern (5) is created on the surface of the food. The shape of the pressing member can be selected such that it produces the desired pattern.

In normal use of embodiment of the invention, the pressing member (4) is maintained in a raised position, the cooking chamber (1) is opened and food (3) is introduced and placed on the support member (2). The cooking chamber (1) is then preferably closed and the pressing member (4) is optionally lowered down to press the food (3), depending on the desired function of the oven. Optionally, the oven can be turned on in advance such that the first and second heating members preheat the cooking chamber (1) and the pressing member (4).

The electric oven of the present invention further preferably comprises actuating means for moving the pressing member (4). These actuating means can be in a plurality of forms, preferably in the form of a simple, cost-effective hand operated leverism. The leverism preferably comprises a hand operated lever (6) located at the outer lateral side of the box shaped frame defining the cooking chamber (1) such that the user can conveniently choose whether or not to engage the pressing member (4) even while the chamber is closed, thereby preventing the user from being in prolonged contact with the heat of the cooking chamber and minimizing the heat loss from the cooking chamber. This in turn facilitates the maintenance of an even temperature in the cooking chamber throughout the cooking process.

The electric oven further optionally comprises blocking means for fixing the pressing member (4) in a specific position. This allows the pressing member to be fixed, such as in a raised position or in a lowered position, pressing the food (3) against the support member (2). The blocking means are preferably adapted to cooperate with the actuating means for blocking the actuating means and thereby in turn preventing the movement of the pressing member (4). Even more preferably, also the blocking means are operated from outside the cooking chamber (1).

In a different embodiment of the present invention the pressing member is movable by its own weight along a shaped guide defining at least one first blocking position for the pressing element in a position for pressing the food to be cooked against said support element, and at least one second blocking position for the pressing element in a position spaced apart from the food to be cooked.

In a different embodiment of the present invention the support member has its own heating means or is coincident with one of the heating members.

In a different embodiment of the present invention the pressing member defines in turn a surface for supporting food as it is possible to set the distance of the food to be cooked from the heating member.

The electric oven thus conceived in susceptible to numerous modifications and variations, all falling within the scope of the inventive concept; furthermore, all details may be substituted by technically equivalent elements.

In practice, any material type or size may be used, according to the needs and the state of the art.

The invention claimed is:

1. An electric oven comprising:
    a cooking chamber having at least one heating member; and
    at least one support member disposed within said cooking chamber for supporting food, wherein said cooking chamber is provided with a vertically movable pressing member for pressing said food against said at least one support member to cook said food while kept pressed, said vertically movable pressing member being movable so as to uniformly press against said food in a horizontal plane when said cooking chamber is closed;
    actuating means for moving said pressing member, said actuating means including a hand operated lever disposed on a lateral outer side of said cooking chamber; and
    blocking means for fixing the pressing member in any position, wherein said blocking means are adapted to cooperate with the actuating means for blocking the actuating means while the cooking chamber is closed and in which said blocking means are operated from outside the cooking chamber and the pressing member is movable under its own weight along a shaped guide defining at least one first blocking position for the pressing member in a position for pressing food to be cooked against said at least one support member, and at least one second blocking position for the pressing member in a position spaced apart from the food to be cooked.

2. An electric oven as claimed in claim 1, wherein said pressing member is heat conductive.

3. An electric oven as claimed in claim 1, wherein said pressing member comprises a wire rack.

4. An electric oven as claimed in claim 1, wherein said at least one support member is heat conductive.

5. An electric oven as claimed in claim 1, wherein said at least one support member comprises a tray.

6. An electric oven as claimed in claim 1, wherein said at least one support member has its own heating means.

7. An electric oven as claimed in claim 1, wherein said at least one support member is coincident with at least one heating member.

8. An electric oven as claimed in claim 1, wherein said pressing member defines in turn a surface for supporting food.

9. An electric oven as claimed in claim 2, wherein said pressing member comprises a wire rack.

10. An electric oven as claimed in claim 2, wherein said at least one support member is heat conductive.

11. An electric oven as claimed in claim 3, wherein said at least one support member is heat conductive.

12. An electric oven as claimed in claim 2, wherein said at least one support member comprises a tray.

13. An electric oven as claimed in claim 3, wherein said at least one support member comprises a tray.

* * * * *